June 2, 1970 R. B. DICZHAZY 3,515,977
CYCLOCONVERTER BLANKING CIRCUIT
Filed July 24, 1968 2 Sheets-Sheet 1

RAYMOND B. DICZHAZY
INVENTOR.
BY H. M. Saragovitz
E. J. Kelly
H. Berl
and J. J. Swartz
ATTORNEY June 2, 1970 R. B. DICZHAZY 3,515,977

CYCLOCONVERTER BLANKING CIRCUIT

Filed July 24, 1968 2 Sheets-Sheet 2

RAYMOND B. DICZHAZY
INVENTOR.

H. M. Saragovitz
BY. E. J. Kelly
H. Berl
and J. J. Swartz
ATTORNEYS

United States Patent Office 3,515,977

Patented June 2, 1970

3,515,977

CYCLOCONVERTER BLANKING CIRCUIT

Raymond B. Diczhazy, Chagrin Falls, Ohio, assignor, by mesne assignments, to the United States of America as represented by the Secretary of the Army Filed July 24, 1968, Ser. No. 747,233
Int. Cl. H02m *1/08, 5/00*
U.S. Cl. 321—18 1 Claim

ABSTRACT OF THE DISCLOSURE

A trigger signal generating circuit means for a cycloconverter. Circuit means are provided for generating first and second trigger signals in response to the polarity of the alternating current output signal of the cycloconverter and in particular when the output signal most nearly approaches zero current. In response to the trigger signals, control circuit means supply switching signals for controlling the cycloconverter so that the cycloconverter output signal minimizes distortion.

This invention relates to cycloconverters. In particular, this invention relates to a signal producing circuit for selectively switching groups of current interrupting devices within a cycloconverter in response to the cycloconverter output current. Still more particularly this invention relates to a highly sensitive trigger signal generating circuit means for controlling a signal producing circuit which is utilized in a cycloconverter.

The function of cycloconverters is generally to convert a high frequency signal to a low frequency signal. To accomplish this, groups of rectifying and switching devices are utilized which are alternately rendered conductive depending upon the time when the low frequency output signal has zero current. In the past, the devices which were used to sense this current and control the rectifying and switching devices were inaccurate. Hence the exact time when the switching devices are rendered conductive is inaccurate and the low frequency output wave form is distorted and the output power is diminished.

For a general description of cycloconverters, reference may be had to U.S. Pat. No. 3,315,143, patented Apr. 18, 1967, the subject matter of which was jointly invented by Messrs. Lawrence and Washko along with Mr. Diczhazy, the author of the present invention. A circuit means for selectively switching groups of rectifying and switching devices utilized in a cycloconverter is disclosed in U.S. Pat. No. 3,320,514, however the switching means disclosed therein is slow and inaccurate. The invention disclosed herein represents an improvement over that patent in that it is more sensitive and positive in switching.

Accordingly, it is an object of the present invention to eliminate the aforementioned disadvantages.

It is another object of the present invention to provide a circuit for selectively switching groups of rectifying and switching devices of a cycloconverter.

It is still another object of the present invention to provide a cycloconverter system which has a sinusoidal output wave form.

It is yet another object of the present invention to provide a trigger signal circuit means for a cycloconverter system which provides positive switching action at current cross-over.

A further object of the invention is to provide a trigger signal generating circuit means for a cycloconverter system which has increased sensivity to current signals.

It is a still further object of the present invention to provide a trigger signal generating circuit means for a cycloconverter system which is less susceptible to noise.

Other objects and advantages of the present invention will become apparent to those of ordinary skill in the art by the following description when considered in relation to the accompanying drawing of which:

Figure 1:
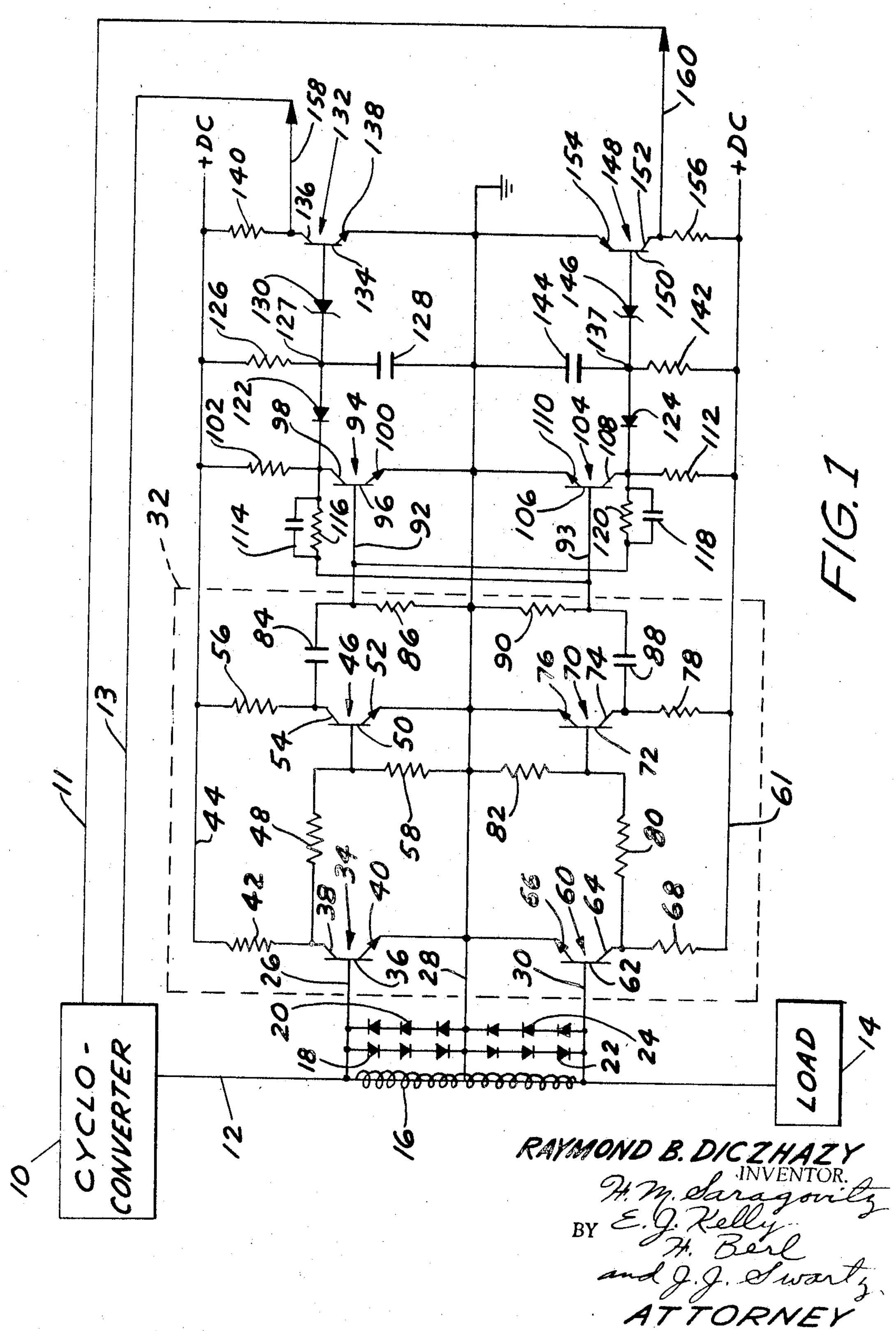
FIG. 1 is the circuit diagram of the trigger signal generating circuit means for a cycloconverter according to the invention.

Referring now to the drawing, a cycloconverter is shown generally at 10. As described hereinbefore, a cycloconverter is a device which converts an alternating current signal, generally of a high frequency, to an alternating current output signal having a lower frequency. To accomplish this, switching and rectifying devices, such as silicon controlled rectifiers (SCR's) are switched on and off in an appropriate sequence to provide the low frequency output signal. Generally, one set of SCR's will be conducting when the alternating output signal is in the positive half-cycle and a second group of SCR's will be gated to conduct when the output signal is in the negative half-cycle. In order to obtain a true sinusoidal output signal, the alternate switching of the groups of SCR's must be accomplished when the output signal most closely approximates zero current. If the groups of SCR's are not switched at zero current, the output current is distorted. The gating pulses for controlling the firing of the SCR's are transmitted over conductors 11 and 13. The means by which these gating pulses are controlled is the subject matter of this invention and will be described more fully hereinbelow.

The low output signal from cycloconverter 10 flows to load 14 by means of conductor means 12 which functions as the current supply means for the remainder of the circuit in conjunction with current sensing secondary transformer winding 16. As shown in the drawing, secondary winding 16, comprises a centered tapped winding having a first portion including voltage limiting diodes 18 and 20 connected thereacross intermediate conductors 26 and 28, and a second portion having a voltage limiting diodes 22 and 24 thereacross and intermediate conductors 30 and centered tap conductor 28 which is at ground potential. A forward voltage drop across serially connected diodes 20 and 24 or serially connected diodes 18 and 22 thereby limits the output voltage appearing between either of conductors 26 or 30 and centered tap conductor 28. If desired, of course, Zener diodes may be suitably substituted for the diodes shown in the drawings for providing a fixed voltage of a predetermined value. When the output signal from the cycloconverter 10 is of a first polarity, a voltage pulse will appear at conductor 26. When the current flow from cycloconverter 10 is of an opposite polarity, a voltage pulse will appear at conductor 30.

The trigger signal generating circuit means comprising a novel feature according to the invention is shown generally in the broken line box indicated at 32. This circuit means comprises a first portion having a first transistor 34 and a second transistor 46. Transistor 34 is shown as having a base 36, a collector 38 and an emitter 40. The base 36 is connected to conductor 26 and is adapted to receive the signal from transformer secondary winding 16. The emitter 40 is suitably connected to center tap conductor 28 which is at ground potential. The collector 38 is connected to a positive D.C. voltage source through a resistor 42 by means of conductor 44. A second transistor is provided at 46 having base 50 collector, emitter 52 and collector 54. The base 50 is suitably connected to the collector 38 of transistor 34 through resistor 48. The emitter 52 of transistor 46 is connected to ground potential while the collector 54 is connected to the positive D.C. voltage source through resistor 56. The base 50 of transistor 46 is also connected to resistor 58 which provides a suitable biasing resistor for transistor 46.

The other portion of trigger circuit 32 includes transistors 60 and 70. Similar to transistor 34, transistor 60 has its emitter 66 connected to ground potential and its base 62 connected to second portion of secondary transformer windings 16 by means of conductor 30. The collector 64 of transistor 60 is suitably connected to the D.C. voltage source by means of conductor 61 through resistor 68.

Similar to transistor 46, transistor 70 has its emitter 76 connected to ground potential and its collector 74 connected to the D.C. voltage source through resistor 78. The base 72 of transistor 70 is connected to the collector 64 of transistor 60 through resistor 80. The base 72 is also connected to biasing resistor 82 which has its other end connected to ground potential.

Also included in the trigger signal generating circuit means 32 are two resistor-capacitor networks. The first resistor capacitor network has capacitor 54 connected to collector 84 and resistor 86 connected to ground. The second resistor capacitor network has capacitor 88 connected to collector 74 of transistor 70, and resistor 90 connected to ground potential. As will be described hereinafter, the two resistor-capacitor networks are alternately and oppositely charged and discharged. In response to the alternate charging and discharging of the two capacitor resistor-capacitor networks, first and second trigger signals are supplied from the trigger signal generating circuit on conductors 92 and 93.

The trigger signals which appear on conductors 92 and 93 are supplied to a bistable multivibrator comprising transistors 94 and 104. The emitters 100 and 110 of transistors 94 and 104 respectively are connected together at ground potential. The bases 96 and 106 of transistors 94 and 104 respectively are connected to conductors 92 and 93 respectively to receive the trigger signals. The collectors 98 and 108 are connected to the D.C. voltage source through resistors 102 and 112 respectively. In accordance with the standard bistable multivibrator configuration, the collector 98 is connected to the base of transistor 104 through coupling network comprising resistor 116 and coupling capacitor 114. Similarly, collector 108 is connected to the base 96 of transistor 94 through resistor 120 and coupling capacitor 118. In accordance with standard bistable multivibrator circuitry, the bistable circuit is at rest in either one of the stable states. When triggered by an input pulse, the circuit switches to the second stable state where it remains until triggered by another pulse.

In conjunction with the multivibrator circuit, transistors 132 and 148 comprise the control circuit means for controlling the output of cycloconverter 10. Transistors 132 and 148 have their emitters 138 and 154 connected together at ground potential. Similarly their collectors are connected to the D.C. voltage source through resistors 140 and 156. Base 134 of transistor 132 is connected to the junction point of resistor 126 and capacitor 128 through a Zener diode 130. A diode 122 is connected between this junction and the collector 98 of transistor 94 and provides a low impedance path toward collector 98.

Similarly transistor 148 is connected to the junction of capacitor 144 and resistor 142 through Zener diode 146. A diode 124 is connected between this junction and the collector 108 of transistor 104 and is arranged to provide a low impedance path toward collector 108. As will be described hereinafter, the charging of capacitors 128 and 144 from the D.C. voltage source to a potential above the break-down voltage of Zener diodes 130 and 146 will control the conduction of transistors 132 and 148. The collector 136 of transistor 132 is connected to conductor 13 for controlling one portion of the cycloconverter switching and rectifier network which comprises a positive group of SCR's permitting positive half-cycle current to flow to load 14. Collector 152 of transistor 148 is connected to conductor 11 which provides the control signal for another group of switching and rectifying devices of the cycloconverter comprising a negative group of SCR's which permit negative half-cycle current to flow to load 14.

Figure 2:
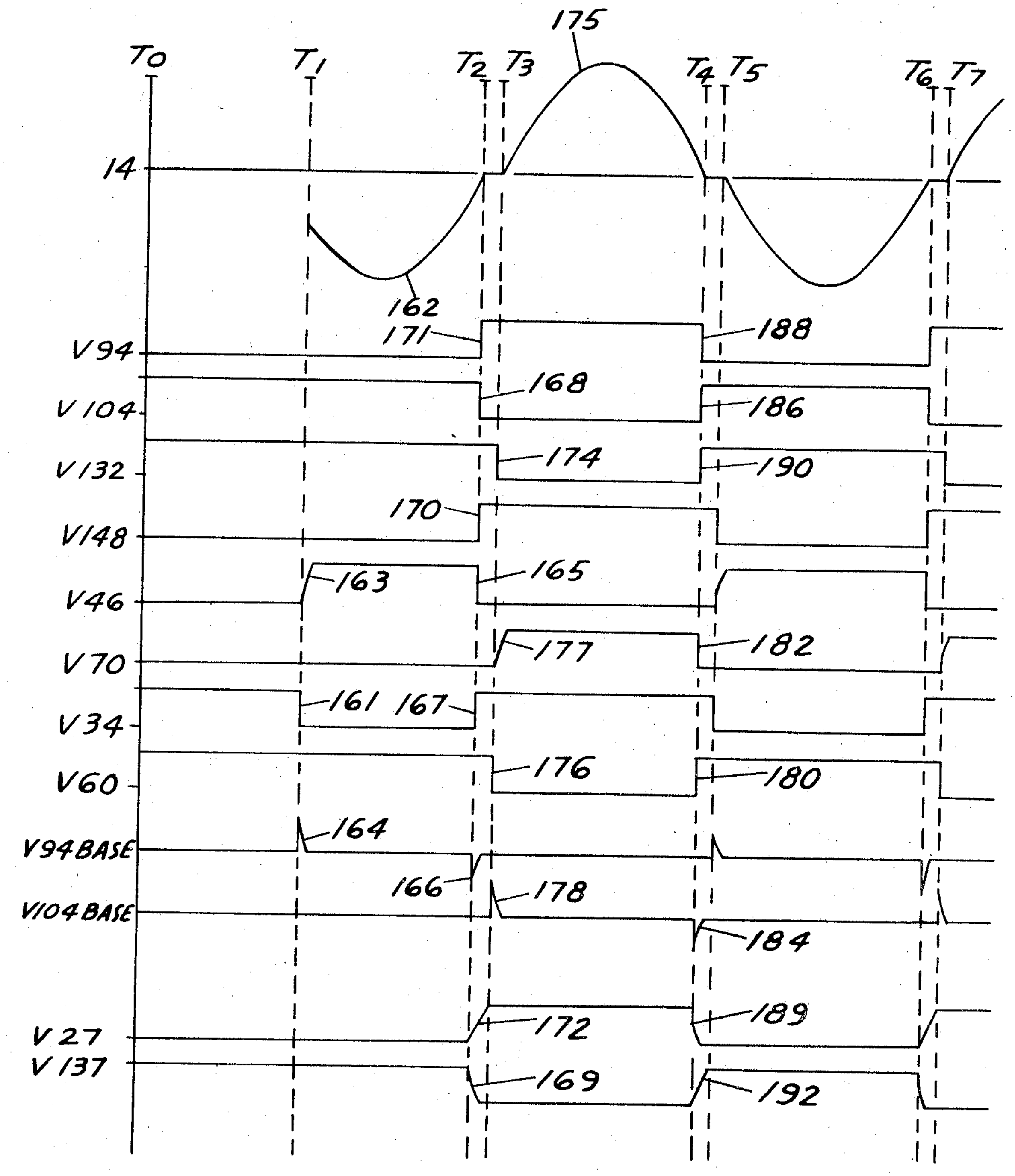
FIG. 2 is a series of waveforms at several points in the circuit shown in FIG. 1.

The voltage waveforms across each of the transistors at various time intervals during one complete cycle of operation are shown in FIG. 2. The waveform for each particular transistor is indicated by the letter V and a subscript having the same reference numeral as that used to refer to the transistor, e.g., the voltage across transistor 94 is shown as $V_{94}$. The voltage waveforms are plotted against time intervals $T_0$–$T_7$ which represent the following:

$T_0$–$T_1$—no A.C. output current to load
$T_1$–$T_2$—negative A.C. output current to load
$T_2$–$T_3$—switching action occurs and neither group of SCR's are conducting A.C. output current flow
$T_3$–$T_4$—positive A.C. output current to load
$T_4$–$T_5$—switching action occurs and neither group of SCR's are conducting; no A.C. output current
$T_5$–$T_6$—negative A.C. output current to load.

The operation of the circuit can best be described with reference to both FIGS. 1 and 2. With no output current flowing to load 14, no A.C. power is being applied to the circuit during time interval $T_0$–$T_1$. With D.C. voltage applied to the control circuit means, it will be assumed that transistor 94 has a higher gain than transistor 104 of the bistable multivibrator, hence, transistor 94 will be biased into conduction and transistor 104 will be biased to a nonconducting state. The conduction of transistor 94 provides a low impedance path across capacitor 128, thereby preventing the charging of capacitor 128 by the D.C. voltage source. Hence the voltage at the junction 127 is insufficient to break down Zener diode 130. Transistor 132, therefore, remains in a nonconducting state and the D.C. supply voltage appears at the collector of 136. This voltage is supplied to conductor 13 of the cycloconverter which is effective to inhibit positive group firing pulses and hence positive current is prevented from flowing to load 14.

Since transistor 104 is nonconducting a high impedance path is presented between the junction 137 and ground. The nonconducting state of transistor 104 thereby permits charging of capacitor 144 from the D.C. voltage source through resistor 142. When the charge on capacitor 144 exceeds the breakdown potential of 146, transistor 148 is forward biased into conduction. Prior to conduction, the potential at the collector 152 of transistor 148 was of substantial voltage. When the transistor 148 is turned on, the voltage appearing at collector 152 is effectively reduced to ground potential. Thus conductor 11 is substantially at ground potential while conductor 13 is at a substantial D.C. voltage. The conductive state of transistor 148 permits the negative group of SCR's in the cycloconverter to fire thus enabling negative current to flow to the load 14. During time interval $T_0$–$T_1$, transistors 46 and 70 will be biased into conduction thus bypassing capacitors 84 and 88 whereas transistors 34 and 60 will be biased off.

At time interval $T_1$, A.C. power will be permitted to flow from cycloconverter 10 to load 14. With the circuit thus set and transistor 148 conducting, negative current 162 will flow to load 14. It will be assumed that the turns of winding 16 are wound such that negative half cycle current will present a positive pulse at the base of transistor 34 sufficient to bias it into conduction. When transistor 34 conducts as shown at 161, the potential at the base 50 of transistor 46 will be reduced sufficient to cause transistor 46 to become nonconductive as shown at 163. When transistor 46 is nonconductive, a high impedance path is inserted between resistor 56 and ground, thereby causing a charging current to flow through the resistance capacitance circuit 84 and 86. The charging pulse through resistor 86, shown at 164 in FIG. 2, will not affect the conduction of transistor 94 since it is already biased on.

As the negative half-cycle current decays to zero at time $T_2$ in FIG. 2, transistor 34 switches off as shown at 167 and transistor 46 is again rendered conductive as shown at 165. Capacitor 84 discharges through resistor 86 and the discharge pulse 166 at the base of transistor 94 is sufficient to render transistor 94 nonconductive as shown at 171.

When transistor 94 is rendered nonconductive, the potential which is sharply increased at collector 98 is coupled through resistor-capacitor network 114 and 116 to the base of transistor 104. As is conventional in a multivibrator circuit, transistor 104 will be thus biased into conduction as shown at 168. The collector-emitter path of transistor 104 will present a low impedance discharge path for the potential across capacitor 144 and thus preclude the buildup of potential thereacross sufficient to breakdown Zener diode 146 as shown at 169. With Zener diode 146 being nonconductive, transistor 148 will be turned off as shown at 170. The potential at collector 152 rises sharply from a potential near ground to that more nearly approaching the D.C. voltage on line 61. With the potential thus increased on line 11, the negative group of SCR's in the cycloconverter will not receive a firing signal at their gate terminals.

During time interval $T_2$–$T_3$ of FIG. 2, a minimal delaying action takes place whereby no A.C. current output flows to load 14. As already described, the negative half-cycle has approached zero current and the negative group of SCR's are not receiving a gating pulse. At time $T_2$ however, transistor 132 is still nonconductive and the substantial D.C. potential appearing at line 13 precludes the positive group of SCR's from firing in the cycloconverter, hence the positive half-cycle of output current to load 14 does not flow. As shown at 172, the voltage at point 127 builds up until the breakdown potential of Zener diode 130 is exceeded at time $T_3$. Transistor 132 is thus rendered conductive and the potential 172 thereacross is thus sharply reduced. The potential on line 13 is similarly reduced thereby permitting the positive group of SCR's to receive gating signals and allow positive half-cycle current 175 to flow to load 14.

With positive group current flowing to load 14, a signal will appear at conductor 30 which will bias transistor 60 into conduction and sharply reduce the potential 176 thereacross. The potential at the base 72 of transistor 70 is similarly reduced thereby causing transistor 70 to become nonconductive as shown at 177. A high impedance path is thus inserted between resistor 78 and ground potential and capacitor 88 will receive a charging current. The charging pulse 178 across resistor 90 has no affect on transistor 104 since it is already conducting.

Positive half-cycle current 175 thus continues to flow until time $T_4$ at which time it decays to zero and transistor 60 is rendered nonconductive and transistor 70 is rendered conductive as shown at 180 and 182 respectively. Capacitor 88 discharges through transistor 70 and the voltage pulse 184 biases transistor 104 off as shown at 186. The multivibrator switches and transistor 94 is again rendered conductive as shown at 188. Transistor 132 is thereby rendered nonconductive at 190 because of the drop 189 at junction 127. The delaying action previously described takes place from time $T_4$–$T_5$ as the voltage 192 builds up across capacitor 144 sufficient to exceed the breakdown potential of Zener diode 146. The cycle thus continues to repeat itself in the manner described.

It should be noted that the biasing of transistor of 132 into a state of conduction can be delayed by a suitable choice of the values of these two components, a large delay in time can be designed into the circuit between the time when the potential on conductor 13 is reduced from a substantial D.C. potential to one of ground potential. This is also commonly referred to as the dead-band period in a cycloconverter wherein after a suitable predetermined time delay the signal turns off the switching and rectifying devices in the cycloconverter.

The trigger signal generating circuit thus provides a new and improved means of switching the cycloconverter when the output current from the cycloconverter most nearly approaches zero. By means of the combined transistors and charging circuit, much more positive and sensitive switching of the multivibrator occurs. The accurate switching results in an output signal which minimizes distortion previously caused by the inaccurate switching of the switching and rectifying components of the cycloconverter.

Although the transistors have been referred to as being conductive and/or nonconductive in the specification and the appended claims, it will be appreciated that small amount of leakage current may flow within each respective transistor even in its "nonconductive" state.

The potential on the output transistors 132 and 138 and on conductors 11 and 13 have been frequently referred to as being of a substantial D.C. potential. It will be appreciated that this substantial D.C. potential is with respect to ground and is intended to refer to a voltage which more nearly approximates the D.C. voltage source in contradistinction to ground potential.

Since it is obvious that many changes and modifications can be made in the above described details without departing from the nature and spirit of the invention, it is to be understood that the invention is not limited to said details except as set forth in the appended claim.

I claim:

1. In combination, a cycloconverter system comprising:

means for converting an alternating current input signal of a first frequency to a first alternating current output signal of a second frequency and an output supply circuit means for supplying said first signal;

sensing circuit means in circuit relation with said output supply circuit means providing a second signal in response to said first alternating current output signal;

trigger signal generating circuit means connected to said sensing circuit means responsive to said second output signal for providing first and second trigger signals;

said trigger circuit means comprising first and second electronic valve means network responsive to said first output signal for providing said first and second trigger signals;

said first valve network comprising first and second electronic valve means connected in cascade for providing said first trigger signal when the current of said first output signal flows in a first direction and said second valve network comprises third and fourth electronic valve means connected in cascade for providing said second trigger signal when the current of said output signal flows in the opposite direction;

biasing circuit means for rendering said second and fourth valve means nonconductive when said first and third valve means are conductive respectively and first and second resistor capacitor networks connected to each of said second and fourth valve means and being alternately and oppositely chargeable and dischargeable from a D.C. voltage source in response to alternate conduction of said second and fourth valves;

said first valve means comprising a first transistor including a first collector terminal connected to a D.C. voltage source and a second base terminal connected to a first portion of said sensing means to receive said second output signal, said first transistor being conductive when the current of said first alternating current signal flows in a first direction;

said second valve means comprising a second transistor including a first base terminal connected through resistance means to said first collector terminal of said first transistor, said second transistor being nonconductive when said first transistor is conductive;

said third valve means comprising a third transistor including a first collector terminal connected to said D.C. voltage source and a second base terminal connected to a second portion of said sensing means to receive said second output signal, said third transistor being conductive when the current of said first alternating current signal flows in an opposite direction;

said fourth valve means comprising a fourth transistor including a first base terminal connected through a resistance means to said first collector terminal of said third transistor, said fourth transistor being nonconductive when said third transistor is conductive;

first and second resistor capacitor networks connected to the collector terminal of said second and fourth transistors respectively being alternately and oppositely chargeable and dischargeable in response to conduction and nonconduction of said second and fourth transistors whereby said first and second trigger signals are provided for control circuit means;

said control circuit means connected to said trigger signal generating circuit means and said cycloconverter for providing first and second control signals whereby the frequency and shape of said first alternating current output signal are controlled; and said control circuit means comprising a bistable multivibrator switching means for switching states in response to said first and second trigger signals to provide said first and second control signals.

References Cited

UNITED STATES PATENTS

| | | | |
|---|---|---|---|
| 3,315,143 | 4/1967 | Lawrence et al. | 321—7 |
| 3,320,514 | 5/1967 | Lawrence | 321—45 |
| 3,320,515 | 5/1967 | Amato et al. | 321—45 |

WILLIAM M. SHOOP, Jr., Primary Examiner

U.S. Cl. X.R.

321—45, 60